(12) United States Patent
Happel

(10) Patent No.: US 7,252,293 B2
(45) Date of Patent: Aug. 7, 2007

(54) TWO-PART GASKET FOR PIPE-TO-PIPE CONNECTIONS

(75) Inventor: Andrew J Happel, Fort Wayne, IN (US)

(73) Assignee: Press-Seal Gasket Corporation, Fort Wayne, IN (US)

( * ) Notice: Subject to any disclaimer, the term of this patent is extended or adjusted under 35 U.S.C. 154(b) by 84 days.

(21) Appl. No.: 11/051,591

(22) Filed: Feb. 4, 2005

(65) Prior Publication Data
US 2006/0175765 A1 Aug. 10, 2006

(51) Int. Cl.
F16L 17/00 (2006.01)
F16L 33/16 (2006.01)
F16J 15/02 (2006.01)

(52) U.S. Cl. .............. 277/624; 277/611; 277/619; 277/638; 277/626; 277/644; 277/575; 277/905; 285/112

(58) Field of Classification Search .......... 277/611, 277/612, 619, 624, 638, 626, 644, 647, 648, 277/567, 575, 905; 285/112, 110
See application file for complete search history.

(56) References Cited

U.S. PATENT DOCUMENTS

| | | | | |
|---|---|---|---|---|
| 2,230,725 A | * | 2/1941 | Nathan | 277/624 |
| 2,272,811 A | * | 2/1942 | Nathan | 277/619 |
| 2,454,036 A | * | 11/1948 | Clayton-Wright | 277/555 |
| 2,465,175 A | * | 3/1949 | Schwarz et al. | 277/562 |
| 2,517,290 A | * | 8/1950 | De Moude et al. | 277/612 |
| 3,282,594 A | * | 11/1966 | Wheeler | 277/575 |
| 4,066,269 A | | 1/1978 | Linne | 277/228 |
| 4,458,904 A | * | 7/1984 | Delhaes | 277/619 |
| 4,511,152 A | * | 4/1985 | Fournier | 277/612 |
| 4,579,354 A | | 4/1986 | Vassallo et al. | 277/207 A |
| 4,662,662 A | | 5/1987 | Delhaes | 285/379 |
| 4,674,756 A | * | 6/1987 | Fallon et al. | 277/624 |
| 4,818,209 A | | 4/1989 | Petersson et al. | 425/392 |
| 4,834,398 A | | 5/1989 | Guzowski et al. | 277/207 A |
| 4,834,430 A | * | 5/1989 | Vassallo et al. | 285/379 |
| 5,064,207 A | | 11/1991 | Bengtsson | 277/207 A |
| D330,073 S | | 10/1992 | Valls | D23/269 |
| 5,213,339 A | | 5/1993 | Walworth | 277/1 |
| 5,219,189 A | | 6/1993 | Demoisson et al. | 285/105 |
| 5,380,017 A | | 1/1995 | Leeuwenburg et al. | 277/207 A |
| 5,988,695 A | | 11/1999 | Corbett, Jr. | 285/110 |
| 6,142,484 A | | 11/2000 | Valls, Jr. | 277/602 |
| 6,196,552 B1 | * | 3/2001 | Peterson et al. | 277/437 |
| 6,367,802 B1 | | 4/2002 | Knapp | 277/314 |

(Continued)

*Primary Examiner*—Alison K. Pickard
(74) *Attorney, Agent, or Firm*—Baker & Daniels LLP

(57) ABSTRACT

A gasket for pipe-to-pipe connections, which is closely received within a rectangular-shaped annular groove in the bell end of a pipe, and provides a compressive, fluid-tight seal with the spigot end of another pipe. The gasket includes a two-part body having a substantially rectangular profile in section, including a relatively rigid component joined to a relatively resilient component. The resilient component includes a radially inwardly projecting sealing lobe for providing a compressive seal with the spigot end of a pipe, and a reinforcement portion of the rigid component is disposed between the sealing lobe and the pipe bell end to provide a radially non-compressible reaction surface against which the sealing lobe is compressed. The rigid component also includes a tapered leading edge portion for aligning and centering the spigot end of a pipe upon insertion within the gasket, and the leading edge portion is reinforced by a plurality of circumferentially spaced ribs.

15 Claims, 3 Drawing Sheets

U.S. PATENT DOCUMENTS 6,422,569 B1 * 7/2002 Comes et al. ............... 277/437
6,663,112 B1 12/2003 Sporre ....................... 277/611
2004/0108714 A1 6/2004 Houghton ................... 285/110

* cited by examiner

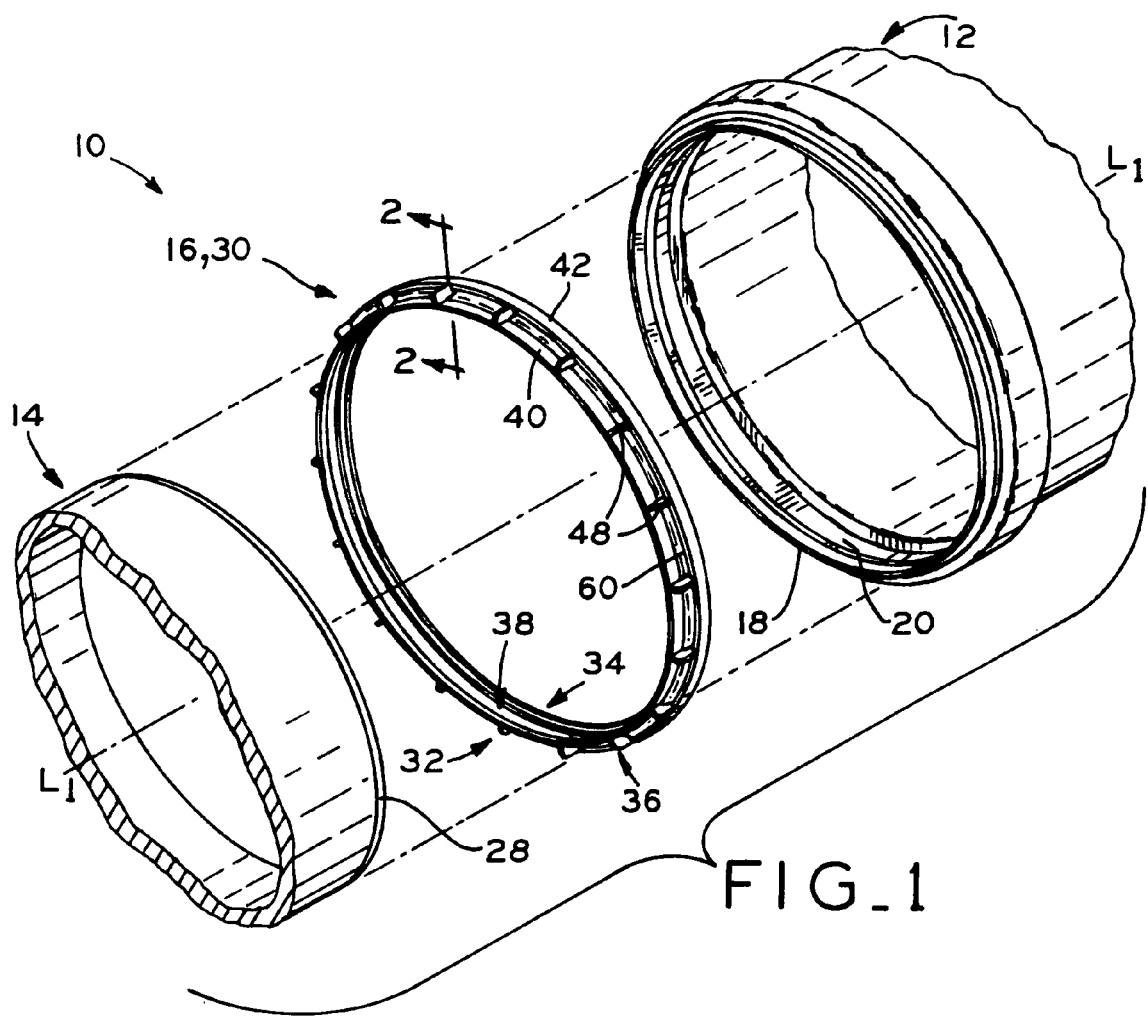
FIG_1
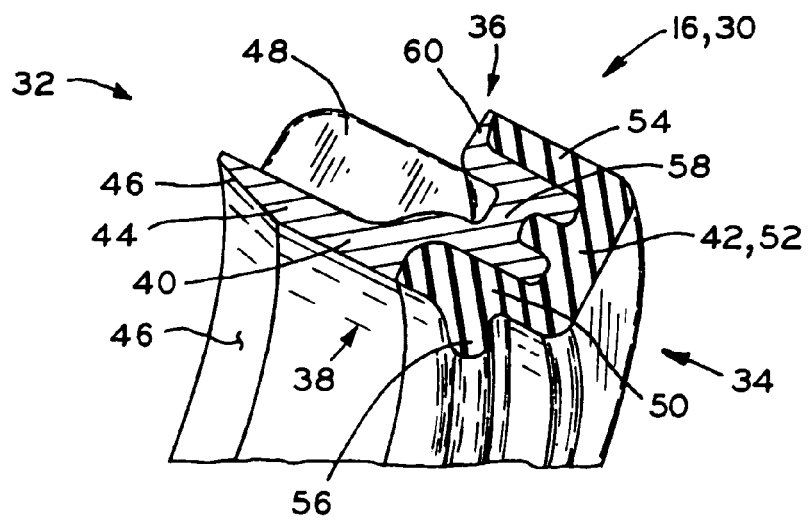
FIG_2

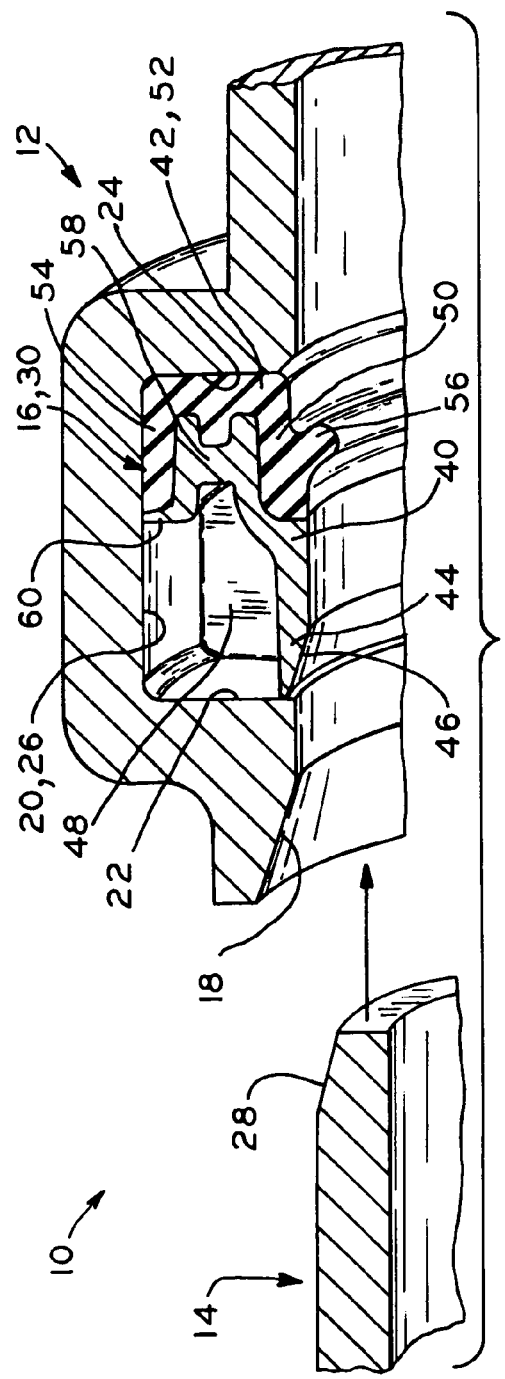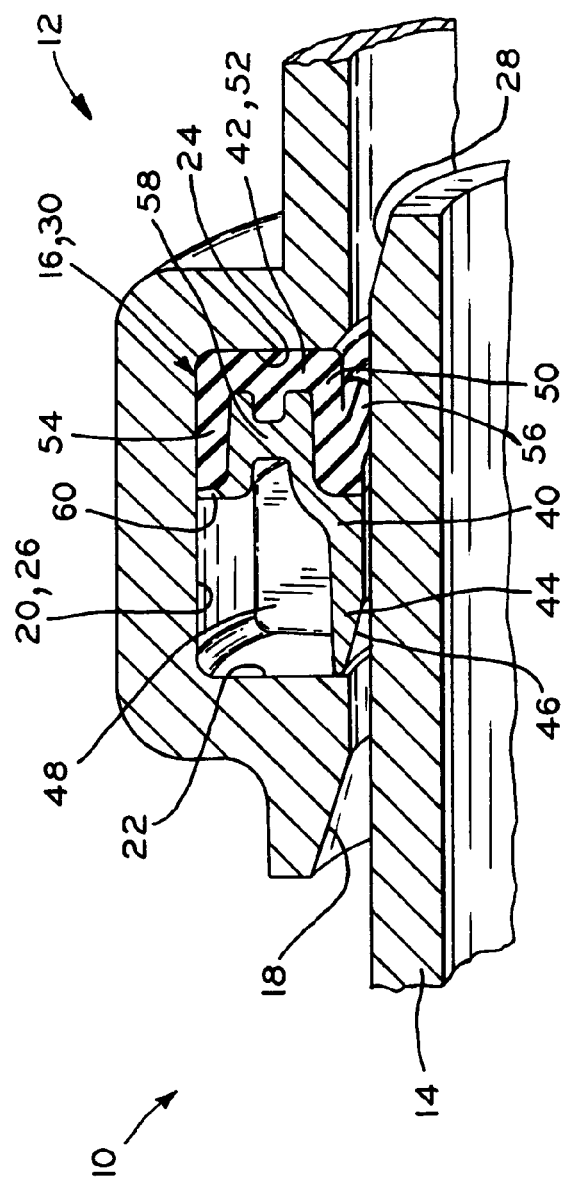
FIG. 4
FIG. 5

TWO-PART GASKET FOR PIPE-TO-PIPE CONNECTIONS

BACKGROUND OF THE INVENTION

1. Field of the Invention

The present invention relates to a gasket for providing a fluid-tight seal in a pipe-to-pipe connection between the bell end of one pipe and the spigot end of another pipe.

2. Description of Related Art

Pipes used in underground pipeline systems, such as municipal sanitary sewer systems and/or storm sewer systems, for example, often include opposite bell and spigot ends, and adjacent pipes are connected to one another by inserting the spigot end of one pipe into the bell end of another pipe. A gasket received within the bell end of one pipe is compressed between the spigot end of another pipe and bell end upon insertion of the spigot end into the bell end to provide a fluid-tight seal between the pipes.

Many plastic pipes include gaskets which are installed within the pipes concurrently with the forming operation of the bell ends according to a process known in the art as the Rieber process. In this process, a gasket having a ramped surface is fitted around a mandrel, and a pipe end which has been heated and softened is pushed over the mandrel and then forced up and over the ramped surface of the gasket before being drawn around a trailing portion of the gasket. When the formed pipe bell end cools, the gasket is retained in place within the bell end and the mandrel is removed.

A disadvantage of these types of gaskets is that they can only be installed within certain types of plastic pipes, and are occasionally prone to being dislodged from the pipe bell end by the pipe spigot end upon insertion of the spigot end into the bell end. In particular, the ramped surface(s) of the gasket, while facilitating formation of the bell end during the Rieber process, may allow the gasket to dislodge from the pipe bell end. Also, if the gasket should become dislodged from the bell end or otherwise fail, the gasket is difficult or impossible to replace in the field, usually requiring the entire pipe section to be discarded.

Other types of gaskets are made entirely of a flexible rubber material and are formed by extrusion, followed by cutting the gasket to length and then splicing the ends of the gasket together to form the annular shape of the gasket. However, these types of gaskets necessarily have a cut length tolerance which effects the uniform diameter of the gaskets. Also, when the extruded material of the gasket is bent into an annulus, the material is placed under tension, which introduces forces into the gasket that could cause the gasket to become more easily dislodged from the groove of a pipe bell end or that might otherwise adversely effect the performance of the gasket.

What is needed is a gasket for pipe-to-pipe connections which is an improvement over the foregoing.

SUMMARY OF THE INVENTION

The present invention provides a gasket for pipe-to-pipe connections, which is closely received within an annular groove in the bell end of a pipe, and provides a compressive, fluid-tight seal with the spigot end of another pipe. The gasket includes a two-part body having a substantially rectangular profile in section, including a relatively rigid component joined to a relatively resilient component. The resilient component includes a radially inwardly projecting sealing lobe for providing a compressive seal with the spigot end of a pipe, and a reinforcement portion of the rigid component is disposed between the sealing lobe and the pipe bell end to provide a radially non-compressible reaction surface against which the sealing lobe is compressed. The rigid component also includes a tapered leading edge portion for aligning and centering the spigot end of a pipe upon insertion within the gasket, and the rigid component is reinforced by a plurality of circumferentially spaced ribs.

The rigid and resilient components of the gasket may be integrally bonded to one another via a "two-shot" molding process, for example, in which the rigid component is molded first and, before the rigid component fully cures, the resilient component is molded to the rigid component to firmly join the components to one another upon curing. The leading, trailing, and outer sides of the gasket are closely received within the rectangular-shaped internal annular groove of the pipe bell end and, upon insertion of the pipe spigot end into the gasket, the gasket firmly seats within the pipe bell end to prevent the gasket from being dislodged from the groove. In particular, a series of circumferentially spaced ribs space the distance between a leading edge of the gasket rigid portion and the bell end annular groove, and also support and properly locate the gasket within the groove.

The rigid and resilient components of the gasket are flexible enough to permit the gasket to be bent inwardly upon itself for positioning the gasket within the pipe bell end. Subsequent release of the gasket allows it to return it to its circular shape to firmly seat within the bell end annular groove. In this manner, the gasket may be easily installed within pre-formed pipes made of any rigid material such as plastic, fiberglass or concrete, for example. Additionally, the gasket may also be easily removed from the pipe bell end for replacement in the field, if needed.

In use, a tapered leading edge of the rigid gasket component aligns and guides the spigot end of a pipe into the gasket to properly center the pipe and to ensure uniform circumferential compression of the sealing lobe of the resilient gasket component. The rigid component includes a reinforcement portion having a substantially I-shaped profile in section which is disposed between the sealing lobe and the outer gasket surface. Upon compression of the sealing lobe when the pipe spigot pipe end is inserted into the gasket, the reinforcement portion provides an inflexible, radially non-compressive reaction surface against which the sealing lobe is compressed, allowing uniform outward radial compression of the sealing lobe to provide a robust, fluid-tight seal with the pipe spigot end In one form thereof, the present invention provides a gasket, including an annular body having a substantially rectangular profile in section, defining axially spaced leading and trailing sides, and radially spaced outer and inner sides, the body further including a relatively rigid component having a plurality of circumferentially spaced ribs therearound; and a relatively resilient component joined to the rigid component and including a sealing lobe projecting radially inwardly from the body inner side In another form thereof, the present invention provides a gasket, including an annular body having axially spaced leading and trailing sides, and radially spaced outer and inner sides, the body further including a relatively rigid component having a plurality of circumferentially spaced ribs therearound, and a leading edge portion extending toward the body leading side; and a relatively resilient component joined to the rigid component and including a sealing lobe projecting radially inwardly from the body inner side In a further form thereof, the present invention provides a gasket, including an annular body having axially spaced leading and trailing sides, and radially spaced outer and inner sides, the body further including a relatively resilient component including a sealing lobe projecting radially inwardly from the body inner side; and a relatively rigid component joined to the resilient component, the rigid component having a radially non-compressible reinforcement portion disposed between the sealing lobe and the body outer side.

BRIEF DESCRIPTION OF THE DRAWINGS

The above-mentioned and other features and advantages of this invention, and the manner of attaining them, will become more apparent and the invention itself will be better understood by reference to the following description of an embodiment of the invention taken in conjunction with the accompanying drawings, wherein:

FIG. 1 is a perspective exploded view of a pipe-to-pipe connection between bell and spigot pipe ends, and a gasket in accordance with the present invention;

FIG. 2 is a sectional view of the gasket of FIG. 1, taken along line 2-2 of FIG. 1;

FIG. 4 is a first sectional view through the pipe bell end and the gasket, showing the initial insertion of pipe spigot end into the pipe bell end; and FIG. 5 is a continuation of FIG. 4, showing the manner in which the sealing lobe of the gasket is compressed upon full insertion of the pipe spigot end to provide a fluid-tight seal between the spigot and bell ends.

Corresponding reference characters indicate corresponding parts throughout the several views. The exemplification set out herein illustrates one preferred embodiment of the invention, in one form, and such exemplification is not to be construed as limiting the scope of the invention any manner.

DETAILED DESCRIPTION

Figure 3:
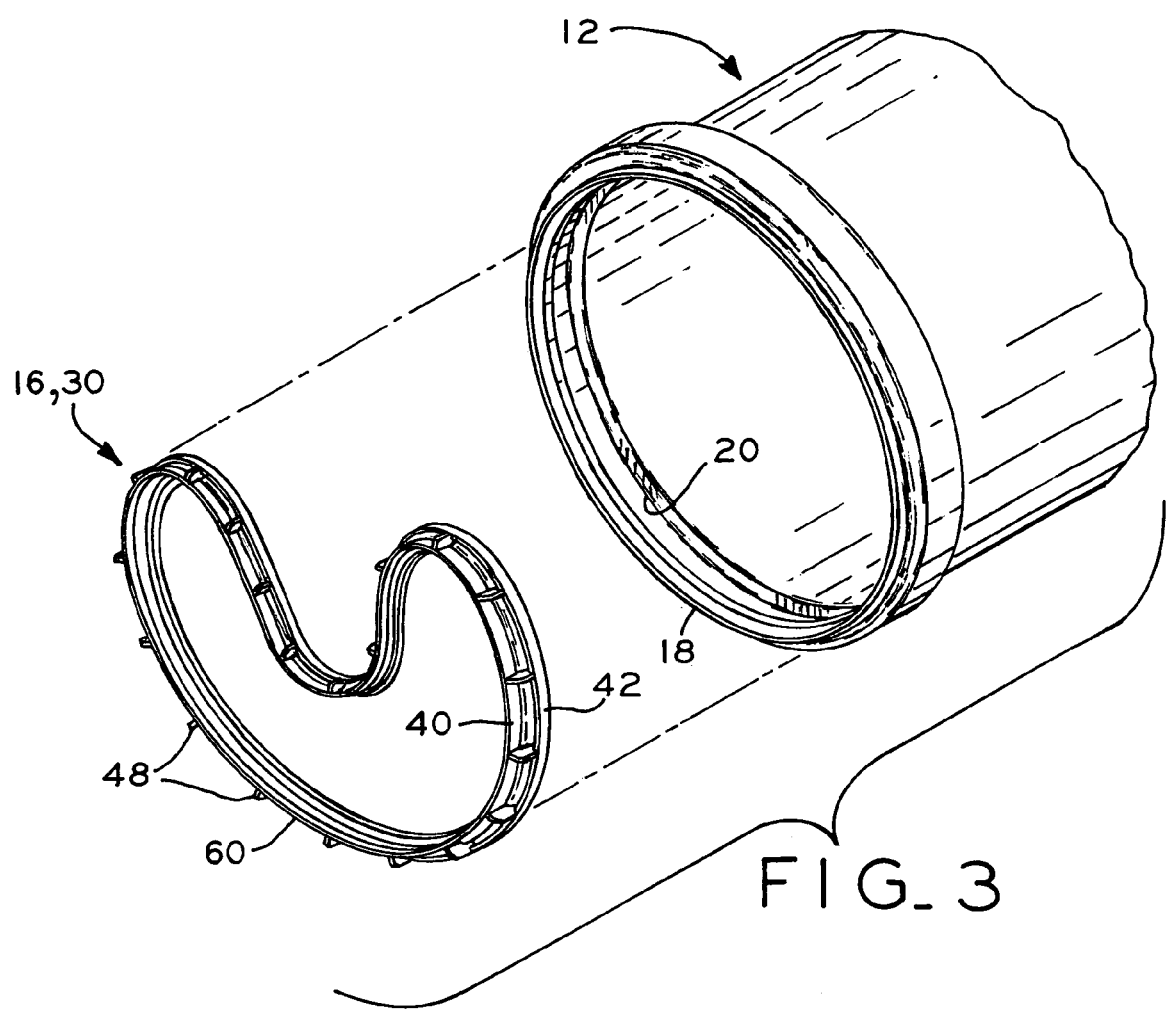
FIG. 3 is an exploded view of a pipe bell end and the gasket of FIGS. 1 and 2, showing an exemplary manner in which the gasket may be bent inwardly upon itself for installing the gasket within the annular groove in the pipe bell end.

In FIG. 1, a pipe-to-pipe connection 10 is shown between the bell end 12 of one pipe and the spigot end 14 of another pipe using a gasket 16 in accordance with the present invention. The pipes may be made of any rigid material, including rigid plastics such as polyvinyl chloride ("PVC"), as well as fiberglass or cement, for example. Referring additionally to FIG. 4, bell end 12 includes a tapered leading edge 18 and internal annular groove 20 having a rectangular shape or profile, including a pair of axially spaced side walls 22 and 24, and an interior wall 26. Spigot end 14 includes an outer chamfer 28 which is disposed at an angle with respect to the common longitudinal axis $L_1$-$L_1$ of bell end 12, spigot end 14, and gasket 16.

Referring to FIGS. 1 and 2, gasket 16 includes an annular body 30 having a substantially rectangular profile in section, including axially spaced leading and trailing sides 32 and 34, and radially spaced outer and inner sides 36 and 38, respectively. Body 30 includes a relatively rigid component 40 made of a semi-rigid plastic material, such as low density polyethylene ("LDPE"), and the material from which rigid component 40 is formed may have a Shore A hardness of at least 90, or at least 100, for example. Body 30 additionally includes a relatively resilient component 32 made of a relatively flexible material, such as rubber, TPE, or another elastomeric material such as Santoprene™, available from Advanced Elastomer Systems LP, an ExxonMobil Chemical Affiliate. (Santoprene™ is a registered trademark of Advanced Elastomer Systems, LP). The material from which resilient component 32 is formed may have a Shore A hardness of between 40 and 80, more preferably between 50 and 70, most preferably about 55.

Rigid component 40 and resilient component 42 may advantageously be formed according to a "two-shot" molding process wherein, for example, rigid component 40 is molded first and, before the material of rigid component 40 fully cures, resilient component 42 is molded to rigid component 40 such that, upon curing of the materials, a firm bond is created therebetween to join rigid component 40 and resilient component 42 to one another. "Two-shot" molding processes are generally known, and the details of same will not be further discussed herein. Molding the gaskets 16 in this manner facilitates uniformity in size and reduces manufacturing tolerances.

Rigid component 40 includes leading edge portion 44 extending along inner side 38 of gasket body 30 toward leading side 32 of gasket body 30, having a tapered, angled leading surface 46 disposed at an acute angle respect to longitudinal axis $L_1$-$L_1$ (FIG. 1). A plurality of circumferentially spaced ribs 48 extend radially between leading edge portion 44 of rigid component 40 and outer side 36 of gasket body 30 to space the distance between leading edge portion 44 and side and interior walls 22 and 26 of annular groove 20 of pipe bell end 12, and thereby provide support for leading edge portion 44 upon insertion of pipe spigot end 14 into gasket 16 as described below. Also, ribs 48 abut side and internal walls 22 and 26 of annular groove 20 to positively locate and position gasket 16 within annular groove 20, wherein ribs 48 minimize the amount of plastic material needed for rigid component 40 of gasket 16.

Resilient component 42 of gasket 16 includes inner section 50, trailing section 52, and outer section 54 which together have a substantially C-shaped profile surrounding the trailing end of rigid portion 40, with inner section 50 also including a radially inwardly-extending sealing lobe 56. As shown in FIG. 2, rigid component 40 substantially defines leading side 32 of gasket body 30 and resilient component 42 substantially defines trailing side 34 of gasket body 30.

Rigid component 40 additionally includes a reinforcement portion 58 having an I-shaped profile or an "I-beam"-type shape in section, which is disposed between inner and outer sections 50 and 54 of resilient component 42 for the purposes discussed below. The I-shaped profile of reinforcement portion 58 minimizes the amount of plastic material needed to form rigid component 40, and also provides a large amount of surface area around reinforcement portion 58 for contact with resilient component 42 of gasket 16 to enhance the integral bonding between rigid and resilient components 42 of gasket 16 when the foregoing components are molded to one another, as discussed above. An annular abutment flange 60 projects radially outwardly from reinforcement portion 58 which, when gasket is received within groove as shown in FIGS. 4 and 5, abuts interior wall 26 of groove 20.

As shown in FIG. 3, although the material of rigid component 40 of gasket 16 is relatively rigid in comparison with that of resilient component 42, the material of rigid component 40 is thinly profiled to allow at least a portion of gasket 16 to be bent inwardly upon itself into a heart-like shape for installing gasket 16 within annular groove 20 in pipe bell end 12. After gasket 16 is bent as shown in FIG. 3 and inserted within annular groove 20, subsequent release of gasket 16 allows gasket 16 to return to its original annular shape to firmly seat within annular groove 20. When gasket 16 is seated within groove 20 as shown in FIG. 4, trailing and outer sections 52 and 54 of resilient component 42 directly abut side wall 24 and interior wall 26 of groove 20, respectively and ribs 48 of rigid component 40 are disposed closely adjacent, or directly abut, side wall 22 and interior wall 26 of groove 20. Additionally, annular abutment flange 60 of reinforcement portion 58 abuts interior wall 26 of groove 20.

Gasket 16 may be installed within groove 20 of pipe bell end 12 at the point of manufacture of the pipe, or alternatively, may be installed by an installer in the field. Gasket 16 may be removed from groove 20 of pipe bell end 12 by using a suitable tool, such as a screwdriver, to pry a portion of gasket 16 outwardly from groove 20, followed by bending gasket 16 into the shape shown in FIG. 3 and removing gasket 16 from groove 20. In this manner, should gasket 16 need to be replaced in the field, gasket 16 may be easily removed from groove 20 of pipe bell end 12 and replaced with a new gasket 16.

In FIGS. 4 and 5, the operation of gasket 16 to provide a fluid-tight seal between spigot end 14 and bell end 12 of the pipes is shown. In FIG. 4, after gasket 16 is seated within annular groove 20 as described above, spigot pipe end 14 is inserted into bell pipe end 12. Chamfer 28 of spigot end 14 cooperates with leading edge 18 of bell end 12 to initially guide spigot end 14 into bell end 12. Thereafter, upon continued insertion of spigot end 14 into bell end 12, chamfer 28 of spigot end 14 contacts surface 46 of leading edge portion 44 of gasket 16 to aid in locating and centering spigot end 14 with respect to gasket 16. Contact between spigot end 14 and leading edge portion 44 also places ribs 48 into firm abutment with interior wall 22 of annular groove 20, with ribs 48 rigidly supporting leading edge portion 44 to positively locate spigot end 14.

Continued insertion of spigot end 14 causes same to contact sealing lobe 56 to compress sealing lobe 56 between spigot end 14 and reinforcement portion 58 of rigid component 40 of gasket 16 while abutment flange 60 concurrently engages interior wall 26 of groove 20. The radially non-compressible, I-shaped profile of reinforcement portion 58 provides a robust reaction surface against which sealing lobe 56 is outwardly radially compressed to enhance the fluid-tight seal between sealing lobe 56 and the outer surface of spigot pipe end 14. Compression of sealing lobe 56 as spigot end 14 is inserted within gasket 16 and bell end 12 additionally imposes a compressive force upon trailing and outer sections 52 and 54 of resilient portion 42, which is directed toward side wall 24 and interior wall 26 of annular groove 20 to thereby compress trailing and outer sections 52 and 54 into engagement therewith, respectively. In this manner, rigid and resilient components 40 and 42 of gasket 16 cooperate with one another to provide a robust, fluid-tight seal between spigot and bell end pipe ends 12 and 14.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A gasket, comprising:
an annular body having a substantially rectangular profile in section, defining axially spaced leading and trailing sides, and radially spaced outer and inner sides, said body further comprising:
  a relatively rigid component having a plurality of circumferentially spaced ribs therearound; and
  a relatively resilient component joined to said rigid component and including a sealing lobe projecting radially inwardly from said body inner side, said rigid component including a reinforcement portion disposed radially in between said sealing lobe of said resilient component and said body outer side.

2. The gasket of claim 1, wherein said rigid and resilient components are integrally bonded to one another.

3. The gasket of claim 1, wherein said rigid component defines said body leading side and said resilient component defines said body trailing side.

4. The gasket of claim 1, wherein said rigid component includes a leading edge portion extending along said body inner side toward said body leading side.

5. The gasket of claim 4, wherein said ribs extend radially between said leading edge portion and said body outer side.

6. The gasket of claim 4, wherein said leading edge portion is tapered at an acute angle with respect to a longitudinal axis of said gasket.

7. A gasket, comprising:
an annular body having a substantially rectangular profile in section, defining axially spaced leading and trailing sides, and radially spaced outer and inner sides, said body further comprising:
  a relatively rigid component having a plurality of circumferentially spaced ribs therearound; and
  a relatively resilient component joined to said rigid component and including a sealing lobe projecting radially inwardly from said body inner side, wherein said rigid component includes a reinforcement portion disposed between said sealing lobe of said resilient component and said body outer side, and said reinforcement portion has a substantially I-shaped sectional profile.

8. A gasket, comprising:
an annular body having axially spaced leading and trailing sides, and radially spaced outer and inner sides, said body further comprising:
  a relatively rigid component having a plurality of circumferentially spaced ribs therearound, and a leading edge portion extending toward said body leading side; and
  a relatively resilient component joined to said rigid component and including a sealing lobe projecting radially inwardly from said body inner side, wherein said rigid component includes a reinforcement portion disposed between said sealing lobe of said resilient component and said body outer side, and said reinforcement portion has a substantially I-shaped sectional profile.

9. The gasket of claim 8, wherein said rigid and resilient components are integrally bonded to one another.

10. The gasket of claim 8, wherein said gasket body has a substantially rectangular profile in section.

11. The gasket of claim 8, wherein said ribs extend radially between said leading edge portion and said body outer side.

12. The gasket of claim 8, wherein said rigid component defines said body leading side and said resilient component defines said body trailing side.

13. The gasket of claim 12, wherein said sealing lobe of said resilient component is disposed adjacent said body trailing side.

14. A gasket, comprising:
- an annular body having axially spaced leading and trailing sides, and radially spaced outer and inner sides, said body further comprising:
- a relatively resilient component including a sealing lobe projecting radially inwardly from said body inner side; and
- a relatively rigid component integrally bonded to said resilient component, said rigid component having a radially non-compressible reinforcement portion disposed radially in between said sealing lobe and said body outer side, wherein said reinforcement portion of said rigid component has a substantially I-shaped profile in section.

15. The gasket of claim 14, wherein said rigid component further comprises:
- a leading edge portion extending along said body inner side toward said body leading side; and
- a plurality of circumferentially spaced ribs each extending between said leading edge and said body outer side.

* * * * *